US006739472B2

(12) United States Patent
Newport (10) Patent No.: US 6,739,472 B2
(45) Date of Patent: May 25, 2004

(54) TORQUE-LIMIT SIGNAL SYSTEM FOR FILLER NECK CAP

(75) Inventor: James B. Newport, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 10/343,876

(22) PCT Filed: Sep. 18, 2001

(86) PCT No.: PCT/US01/28894

§ 371 (c)(1),
(2), (4) Date: Feb. 4, 2003

(87) PCT Pub. No.: WO02/22454

PCT Pub. Date: Mar. 21, 2002

(65) Prior Publication Data

US 2003/0205578 A1 Nov. 6, 2003

Related U.S. Application Data

(60) Provisional application No. 60/233,415, filed on Sep. 18, 2000.

(51) Int. Cl.[7] .............................................. B65D 41/36
(52) U.S. Cl. ................................ 220/293; 220/DIG. 33
(58) Field of Search .................... 220/293, 300–302.86, 220/304, DIG. 33, 288; 116/200, 205, 223, 309, 316, DIG. 17; 215/330, 331

(56) References Cited

U.S. PATENT DOCUMENTS

| 4,083,209 A | 4/1978 | Sloan, Jr. |
|---|---|---|
| 4,280,346 A | 7/1981 | Evans |
| 4,280,347 A | 7/1981 | Evans |
| 4,765,505 A | 8/1988 | Harris |
| 4,913,303 A | 4/1990 | Harris |
| 5,108,001 A * | 4/1992 | Harris ............... 220/203.06 |
| 5,110,003 A | 5/1992 | MacWilliams |
| 5,449,086 A | 9/1995 | Harris |
| 5,638,975 A | 6/1997 | Harris |
| 5,732,841 A * | 3/1998 | Jocic et al. ............ 220/203.24 |
| 5,794,806 A | 8/1998 | Harris et al. |
| 5,904,057 A | 5/1999 | Abney, III et al. |
| 5,924,590 A | 7/1999 | Jocic et al. |
| 6,076,695 A | 6/2000 | Palvoelgyi et al. |
| 6,079,584 A | 6/2000 | Griffin |
| 6,179,148 B1 | 1/2001 | Harris |
| 6,209,746 B1 * | 4/2001 | Gerdes ..................... 220/288 |
| 6,308,852 B1 | 10/2001 | Hagano et al. |

FOREIGN PATENT DOCUMENTS

| DE | G 85 12 655.1 | 4/1985 |
|---|---|---|
| DE | G 85 12 655.1 | 7/1985 |
| WO | WO 00/20292 | 4/2000 |

* cited by examiner

*Primary Examiner*—Jacob K. Ackun
*Assistant Examiner*—Jamila O Williams
(74) *Attorney, Agent, or Firm*—Barnes & Thornburg (57) ABSTRACT

A torque-limit signal cap (10) for a filler neck (14) includes an axially outer portion (16), a filler neck closure (12), and a torque-limit signaler (20). The torque-limit signaler (20) operates during cap installation to interrupt temporarily a driving connection established between the axially outer portion (16) and the closure (12) to provide a tactile and/or auditory signal to a user turning the cap (10) in the filler neck (14) indicating that sufficient torque has been applied to the axially outer portion (16) to seat the closure (12) in a filler neck-closing position in the filler neck (14).

32 Claims, 6 Drawing Sheets

TORQUE-LIMIT SIGNAL SYSTEM FOR FILLER NECK CAP

This application claims the benefit of provisional application No. 60/233,415, filed Sep. 18, 2000.

BACKGROUND AND SUMMARY OF THE INVENTION

The present invention relates to filler neck caps, and particularly to a rotatable cap for closing the open mouth of a filler neck. More particularly, the present invention relates to a filler neck closure cap designed to indicate to the user the minimum acceptable closure torque to effect a sealed position in a filler neck.

Conventional caps for closing the filler neck of a vehicle fuel tank typically include a closure member carrying a seal for closing and sealing the mouth of the filler neck and a handle for turning the closure member to mount the closure member and seal in the filler neck. A typical filler neck cap includes a ring-shaped seal made of a resilient gasket material that is compressed between the cap and a filler neck receiving the cap to establish a sealed connection between the cap and the filler neck when the cap is mounted on the filler neck.

Frequent over-tightening of a filler neck fuel cap can crush or otherwise damage the O-ring gasket which provides the seal between the cap and the filler neck. A torque-control mechanism was developed to limit positively the amount of torque which could be applied by a user in the cap-advancing direction as the user rotates the cap on the filler neck to its fully seated filler neck-closing position thereon. Thus, a torque-control mechanism helps minimize wear and tear on the O-ring gasket and preserves the sealing capability of the gasket. See, for example, U.S. Pat. Nos. 4,913,303 to Harris, 4,083,209 to Sloan, Jr., and 5,110,003 to MacWilliams and International (PCT) Publication No. WO 00/20292 (published Apr. 13, 2000) to Harris, the disclosures of which are hereby incorporated by reference herein.

In recent applications, however, a more pervasive problem is cap under-tightening, that is, failure of users to tighten the cap to a properly torqued installed position on a filler neck. A filler neck cap in accordance with the present disclosure is made to address the under-tightening problem.

According to the present disclosure, a filler neck cap includes an axially outer portion rotatable about an axis of rotation, an axially inner portion adapted to close the filler neck, and a torque-limit signaler coupled to the axially outer and inner portions. The torque-limit signaler is configured to provide an audible and/or tactile and/or other receivable signal to a user (as the user is rotating a cap in a cap-advancing direction to its installed position within a tank filler neck) so that the user will be made aware that the cap has been "torqued" or "tightened" to an acceptable limit and has been installed properly within the filler neck. Once the user senses the signal produced by the torque-limit signaler, the user will know not to rotate the cap further in the cap-advancing direction and the cap therefore will be left in a properly torqued or tightened position within the filler neck.

In illustrative embodiments, the axially inner portion includes a closure base and an O-ring seal around the closure base. The axially outer portion includes a rotatable handle and a rotatable torque-transmission member positioned to lie between the handle and the closure base. The torque-limit signaler includes four "units" located between the torque-transmission member and the closure base. Each of these signaler units includes several lugs and notches on the underside of the torque-transmission member and a flexible spring arm cantilevered to one interior edge of a radially extending annular flange coupled to the closure base. The flexible spring arm extends into a lost-motion signal slot formed in the radially extending annular flange and carries a spring head that is movable on the flexible spring arm in axially up and down directions to "interact" with the lugs and notches on the underside of the torque-transmission member.

A torque-limit signal is produced by the interaction between the spring head and its companion lugs and notches at a certain stage during rotation of the handle in a cap-advancing direction to install the cap in a filler neck. This torque-limit signal alerts a person rotating the handle about the axis of rotation in the cap-advancing direction that the cap has been torqued or tightened to an acceptable limit and the closure base has been installed properly within the filler neck. For example, as the person is rotating the handle in the cap-advancing direction, a spring head (carried on a flexible spring arm) will slip downwardly out of a drive notch located between first and second lugs to allow lost-motion movement of the torque-transmission member relative to the closure base through a predetermined acute angle to cause torque transmission from the torque-transmission member to the closure base to be interrupted temporarily. As a result of this temporary interruption, the closure base will not rotate about the axis of rotation in response to continued rotation of the handle and the torque-transmission member in the cap-advancing direction through a small angle of about 10°.

An audible noise and/or a tactile sensation associated with such interaction of the spring head carried on the flexible spring arm and the lugs and notches on the underside of the torque-transmission member provided to the person rotating the handle during temporary interruption of torque transmission from the torque-transmission member to the closure base will be the "signal" that the closure has been torqued or tightened sufficiently and that rotation of the handle in the cap-advancing direction is not causing the closure to rotate further in the filler neck. Once the person has rotated the handle and the torque-transmission member through that small lost-motion angle relative to the closure base, one of the lugs coupled to the underside of the torque-transmission member and arranged to extend into the lost-motion signal slot formed in the radially extending annular flange will contact an edge of the lost-motion signal slot to reestablish the driving (i.e., torque-transmitting) connection between the torque-transmission member and the closure base in the filler neck.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is an exploded perspective view of a filler neck cap in accordance with the present disclosure, the cap including a closure base adapted to fit into an underlying open-mouthed filler neck, an annular handle retainer around the closure base, a torque-transmission member overlying the closure base, a torque-limit signaler comprising four deflectable spring arms carried on an annular upper flange appended to the closure base and a lug-and-notch set formed on the underside of the torque-transmission member for each of the four deflectable spring arms, a handle (inverted) configured to overlie the torque-transmission member, a rotary spring between the torque-transmission member and the handle, and a lost-motion driver comprising a pair of drive posts mounted on an underside of the handle, each drive post being sized to fit into an arcuate "lost-motion" drive slot formed in the torque-transmission member (which drive slot has a drive receiver at each of its ends);

DETAILED DESCRIPTION OF THE DRAWINGS

Figure 1:
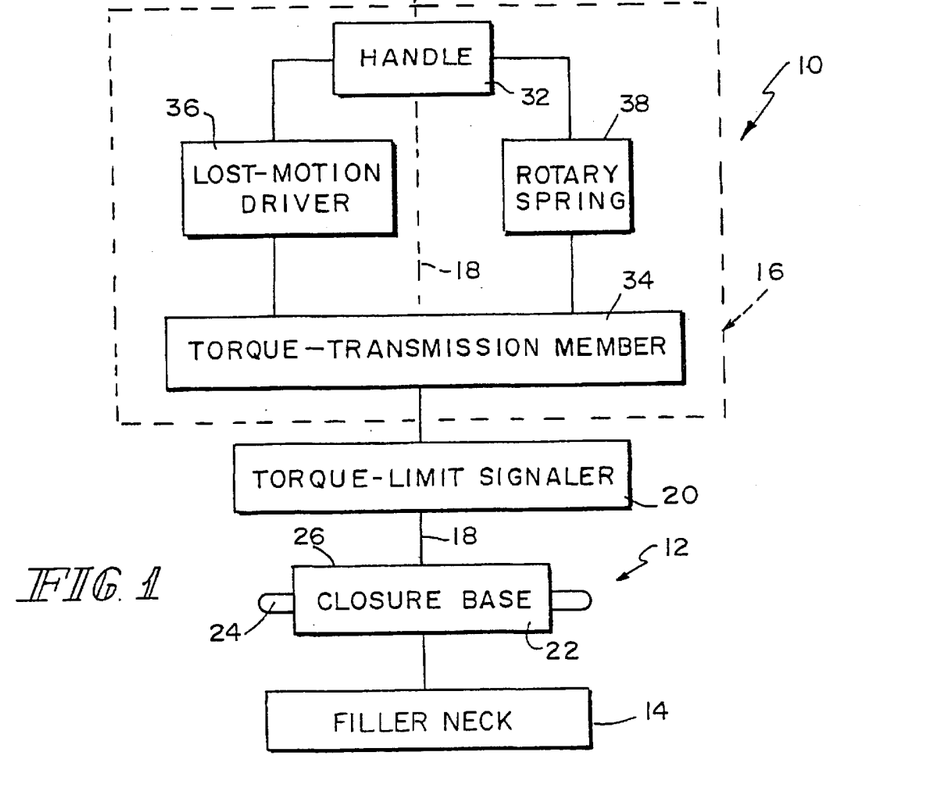
FIG. 1 is a block diagram of a torque-limit signal cap for a filler neck showing an axially inner portion comprising a closure base carrying an O-ring seal, an axially outer portion (in phantom) comprising a handle, a torque-transmission member, a lost-motion driver, and a rotary spring, and a torque-limit signaler coupled to the axially outer and inner portions.

Filler neck cap 10 includes an axially inner portion (closure) 12 adapted to close a filler neck 14, an axially outer portion 16 rotatable about an axis of rotation 18, and a torque-limit signaler 20 coupled to axially inner and outer portions 12, 16 as suggested in FIG. 1. Torque-limit signaler 20 operates to interrupt temporarily a driving (i.e. torque-transmitting) connection between axially outer portion 16 and closure 12 when closure 12 is seated properly in filler neck 14 during installation of cap 10 in filler neck 14 as shown, for example, in FIGS. 11 and 12. This temporary interruption functions to "signal" a user rotating axially outer portion 16 in a clockwise, cap-advancing direction during installation of cap 10 in filler neck 14 that sufficient torque has been applied to axially outer portion 16 by the user during installation of closure 12 in filler neck 14 to seat closure 12 in a filler neck-closing position in filler neck 14.

In an illustrative embodiment of torque-limit signaler 20, this "signal" is a "slipping" or "lost-motion" movement of rotating axially outer portion 16 relative to a non-rotating closure 12 seated in a filler neck 14, a "snapping" or "clicking" sound associated with the start or end of such slipping, or both. Once signaled by torque-limit signaler 20 that a preset torque limit has been exceeded, the user will understand that no further rotation of axially outer portion 16 in the clockwise, cap-advancing direction is required. The user will then release axially outer portion 16 and leave closure 12 in its filler neck-closing position.

Figure 2:
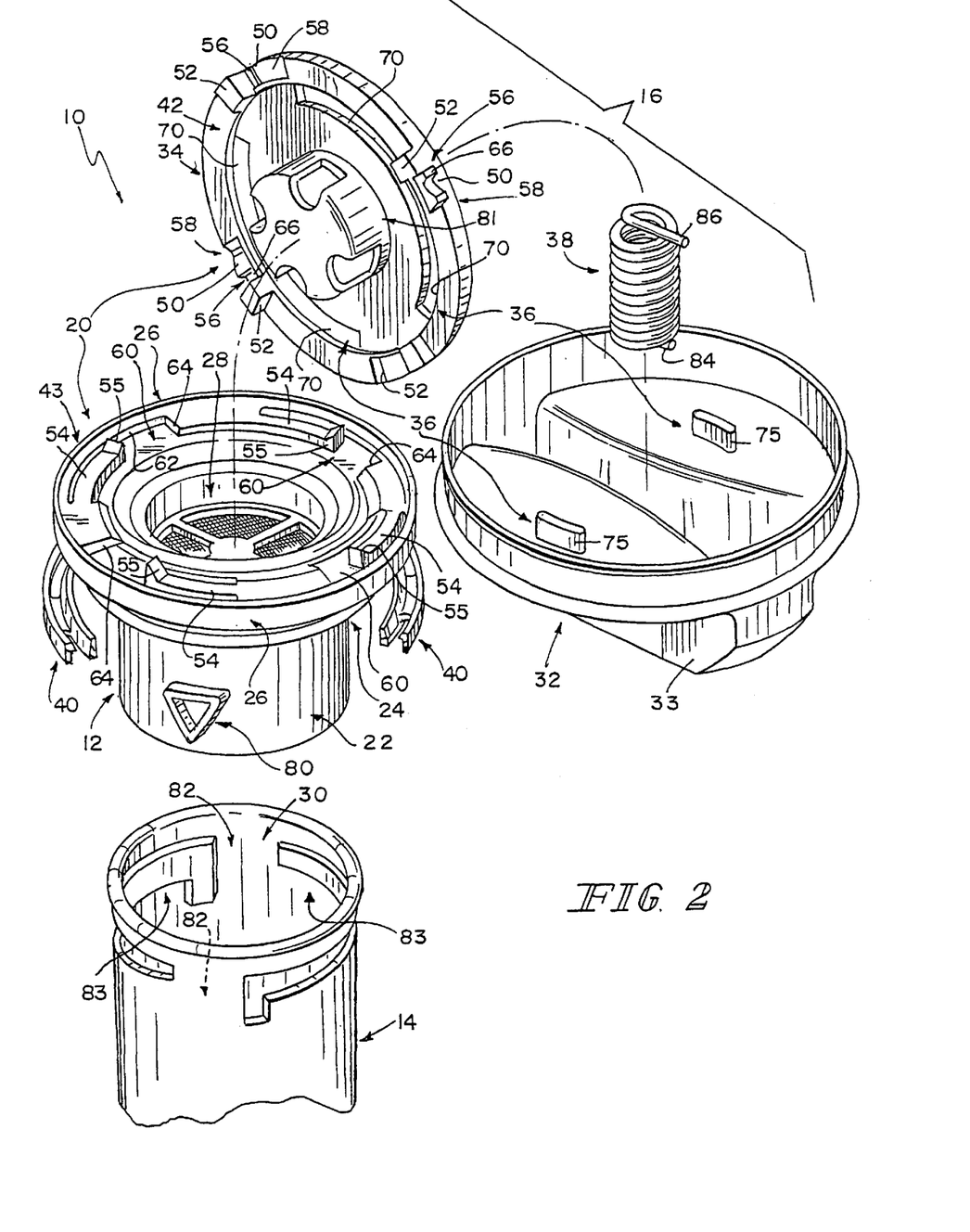
Figure 3:
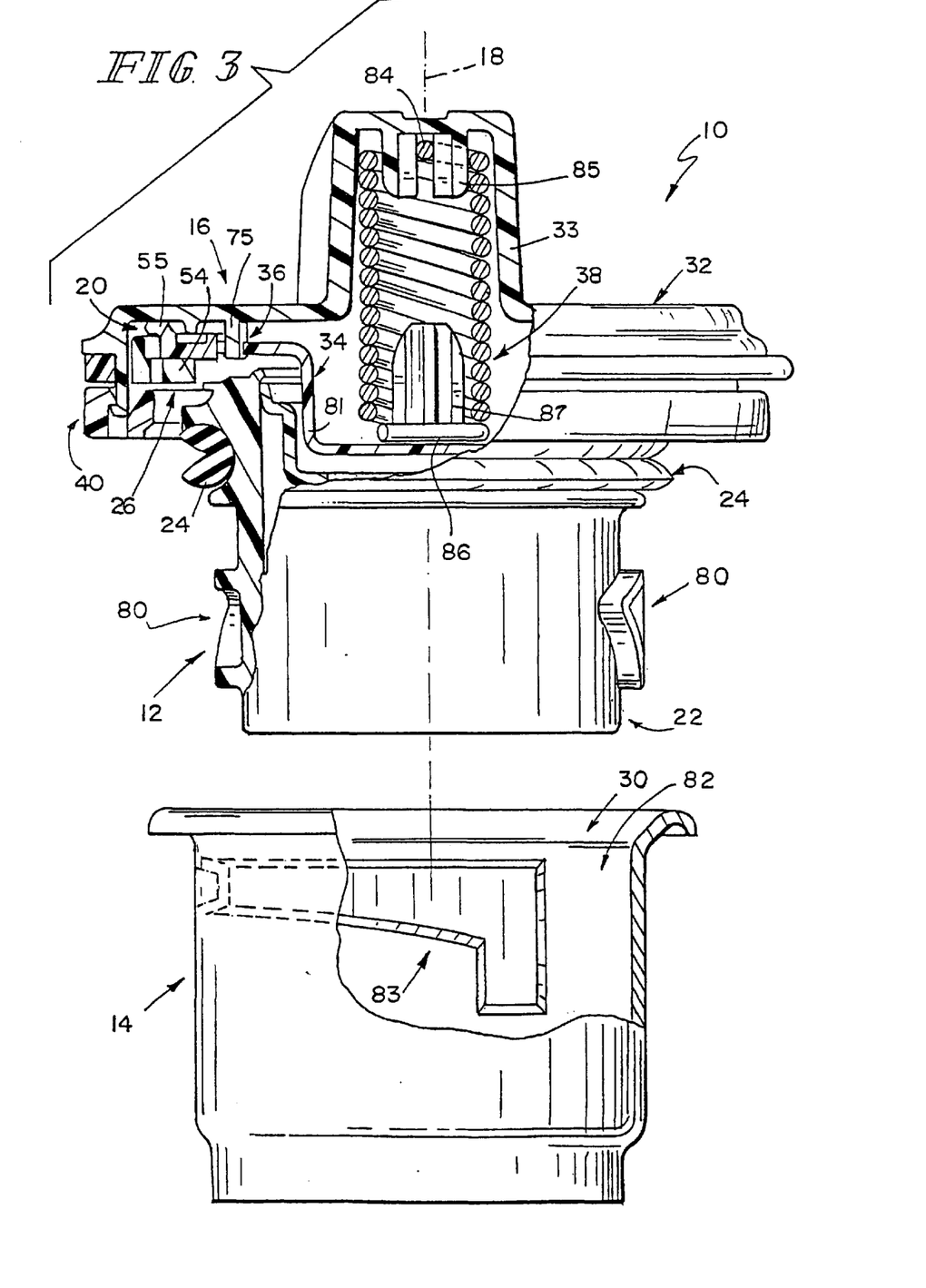
FIG. 3 is a side elevation view of the cap of FIG. 2 (after assembly) prior to insertion of the cap into the mouth of a filler neck, with portions broken away, showing the rotary spring coupled at one end to a spring mount post included in the handle and at another end to a spring mount post included in the torque-transmission member.

Closure 12 is a filler neck closure comprising a closure base 22, an O-ring seal 24 carried on an outer surface of closure base 22, and a radially extending annular flange 26 coupled to closure base 22 and arranged to overlie O-ring seal 24 as shown diagrammatically in FIG. 1 and illustratively in FIGS. 2 and 3. Closure base 22 and radially extending annular flange 26 cooperate to form a monolithic component made of a suitable plastics material. In an illustrative embodiment, a valve assembly 28 including a pressure-relief valve and a vacuum-relief valve is mounted in an axially extending passageway formed in a central portion of closure base 22 as suggested in FIG. 2. Closure base 22 and O-ring seal 24 cooperate to close an open-mouth 30 of filler neck 14 upon movement of closure 12 to assume a filler neck-closing position in filler neck 14.

Axially outer portion 16 comprises a rotatable handle 32, a rotatable torque-transmission member 34 under handle 32, a lost-motion driver 36 coupled to handle 32 and to torque-transmission member 34, and a rotary (e.g. torsion) spring 38 coupled to handle 32 and torque-transmission member 34 as shown diagrammatically in FIG. 1 and illustratively in FIGS. 2 and 3. A retainer 40 is provided to couple handle 32 to radially extending annular flange 26 as suggested for example, in FIGS. 2 and 3 to permit handle 32 (and torque-transmission member 34) to rotate relative to closure 12 about axis of rotation 18 at various stages of cap installation in and removal from filler neck 14.

Torque-limit signaler 20 is configured to provide a temporary torque-limited driving connection between axially outer and inner portions 16, 12. Torque-limit signaler 20 transmits torque from rotatable torque-transmission member 34 to axially inner portion (closure) 12 to cause closure 12 to turn in filler neck 14 during cap installation (in response to rotation of handle 32 and torque-transmission member 34) until closure 12 is installed in filler neck 14 and the torque applied by torque-transmission member 34 to closure 12 begins to exceed a predetermined or preset torque limit. Once the preset torque limit is exceeded, torque-limit signaler 20 produces an audible and/or tactile and/or other receivable signal to a user so that the user will know not to turn the cap 10 further in a clockwise, cap-advancing direction in filler neck 14, which could lead to "over-tightening" the cap 10 in the filler neck 14.

Torque-limit signaler 20 operates to signal over-tightening of closure 12 in filler neck 14 to a user during cap installation in a filler neck, which over-tightening could lead to damage of the O-ring seal 24 positioned to lie between closure base 12 and filler neck 14. O-ring seal 24 is arranged to establish a sealed connection between closure base 22 and filler neck 14 when cap 10 is rotated about axis 18 to assume an installed position within filler neck 14.

Figure 1A:
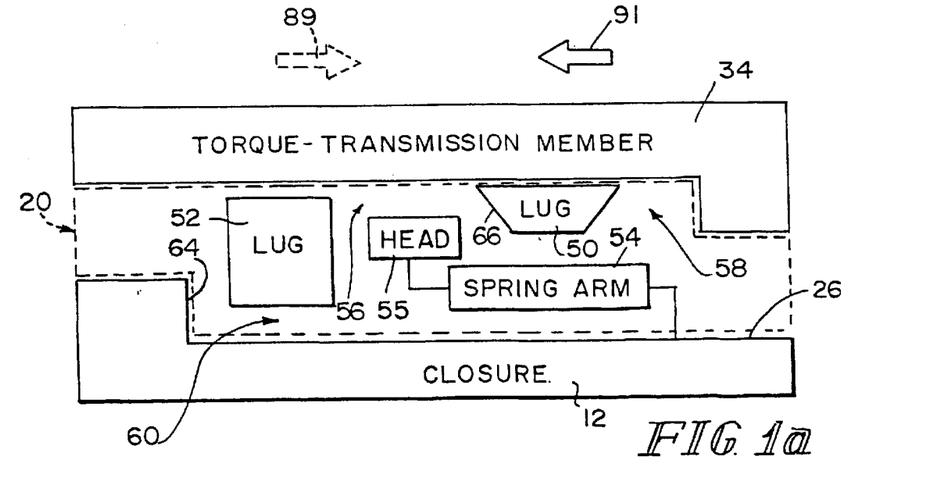
FIG. 1a is a block diagram showing an illustrative torque-limit signaler (in the phantom box) comprising two spaced-apart lugs appended to the torque-transmission member and a movable spring arm coupled at one end to the closure base and at the other end to a head wherein the smaller first lug will engage the head to establish a torque-limited driving connection between the torque-transmission member and the closure base when the torque-transmission member is rotated in a clockwise cap-advancing direction (solid double arrow) and wherein the larger second lug will engage the head to establish a direct-drive driving connection between the torque-transmission member and the closure base when the torque-transmission member is rotated in a counterclockwise cap-removal direction phantom double arrow)

In an illustrative embodiment, torque-limit signaler 20 includes a first set of components and notches provided on an axially inwardly facing underside 42 of torque-transmission member 34 and a second set of components and slots provided on a topside 43 of closure 12 as shown diagrammatically in FIG. 1a and illustratively in FIGS. 2, 4, 5, and 7–18. As shown and described herein, these two sets of components interact with one another to generate a torque-limit signal during cap installation to alert a user to cease rotating handle 32 in a clockwise, cap-advancing direction. In the embodiment illustrated in FIGS. 2–18, there are four torque-limit signaler "units" 20 provided in circumferentially spaced-apart positions at about 90° intervals around the circumference of cap 10.

As suggested in FIG. 1a, each torque-limit signaler 20 comprises a first lug 50, a second lug 52, a flexible spring arm 54, and a spring head 55 on an end of spring arm 54. First and second lugs 50, 52 are appended to underside 42 of torque-transmission member 34 and spaced apart to define a drive notch 56 therebetween. Torque-transmission member 34 is also formed to include a head retainer notch 58 arranged so that first lug 50 lies between drive notch 56 and head retainer notch 58. Drive notch 56 and head retainer notch 58 are sized and located to receive at least a portion of spring head 55 therein at various points during cap installation and removal. One end of spring arm 54 is cantilevered to closure 12 and an opposite end of spring arm 54 carries spring head 55 up and down as the spring arm 54 flexes, bends, or deflects during cap installation and removal.

Figure 4:
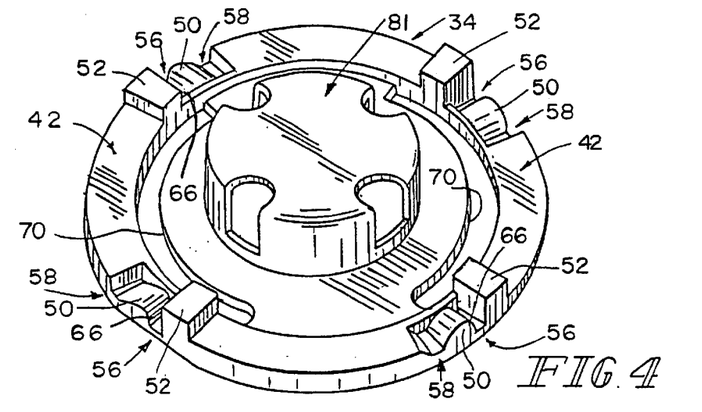
FIG. 4 is a bottom perspective view of the torque-transmission member showing a central rotary spring mount cup, two "banana-shaped" arcuate lost-motion drive slots around the central rotary spring mount cup, and the four sets of lug-and-notch sets formed at "90° intervals" in a ring-shaped flange around the banana-shaped arcuate lost-motion drive slots.
Figure 5:
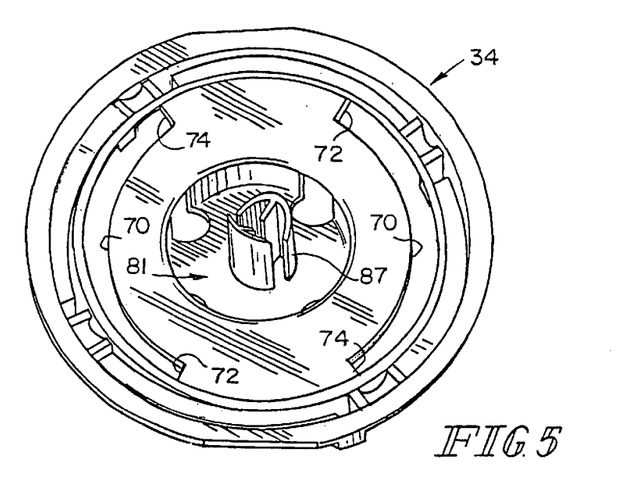
FIG. 5 is a top perspective view of the torque-transmission member shown in FIGS. 2–4 showing an upstanding split spring mount post located in an interior region defined by the central rotary spring mount cup.
Figure 6:
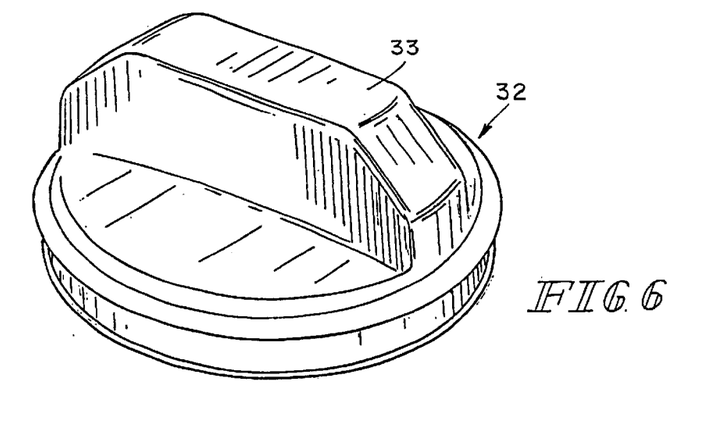
FIG. 6 is a perspective view of the handle shown in FIGS. 2 and 3 showing a handle grip on the top side of the handle.

As shown in FIG. 4, torque-transmission member 34 includes a central portion formed to include a central rotary spring cup 81 and a flat ring arranged to extend around cup 81 and formed to include arcuate lost-motion drive slots 70. Torque-transmission member 34 also includes a radially extending annular rim surrounding the central portion and formed to include the four sets of first and second lugs 50, 52.

Spring arm 54 and spring head 55 cooperate to define a first drive receiver coupled to closure 12 as shown, for example, in FIG. 2. First drive receiver 54, 55 is arranged to contact first lug 50 as shown, for example, on FIGS. 7 and 8 to enable closure 12 to "receive" torque transmitted by axially outer portion 16 to cause closure 12 to rotate about axis 18 in filler neck 14 in response to rotation of axially outer portion 16 in a clockwise, cap-advancing direction during a first stage of cap installation in filler neck 14.

Figure 7:
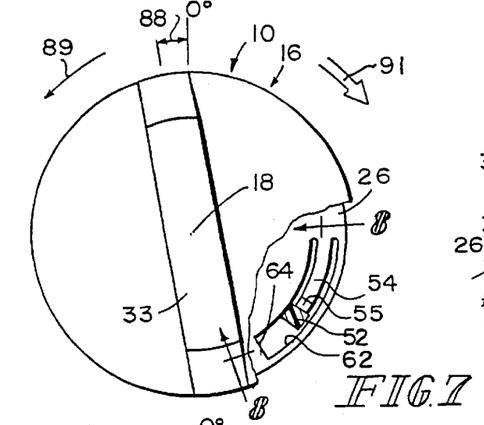
FIG. 7 is a top plan view of the cap of FIG. 3 showing an initial orientation of a handle grip carried on a top side of the cap handle as the cap is being inserted into the filler neck shown in FIG. 3, with a portion broken away to show a lost-motion signal slot formed in an annular upper flange coupled to the closure base, a spring arm cantilevered at one end of that upper flange to extend into the lost-motion signal slot, and a large "second" lug (shown in section) provided on the underside of the torque-transmission member and arranged to move back and forth in the lost-motion signal slot.
Figure 8:
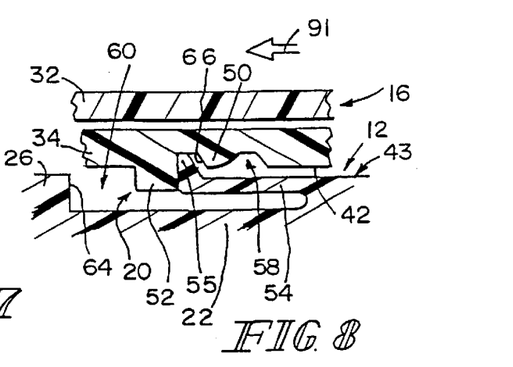
FIG. 8 is a diagrammatic partial sectional view taken along line 8—8 of FIG. 7 showing a spring head formed on one of the spring arms cantilevered to the annular upper flange coupled to the closure base and positioned to lie in a drive notch provided in one of the four lug-and-notch sets provided on the underside of the torque-transmission member and showing that a first drive surface (defined by a ramp face on the small "first" lug) of the torque-transmission member is positioned to engage a first drive receiver (provided in part by the spring head) so that the torque-transmission member will rotate in a clockwise direction (solid double arrow) in response to rotation of the cap handle in the clockwise direction until a preset torque limit is exceeded.

Radially extending annular flange 26 of closure 12 is formed to include four lost-motion signal slots 60 and each spring arm 54 is arranged to extend into one of the four lost-motion signal slots 60 as shown, for example, in FIGS. 2, 7, and 8. As shown in FIG. 7, an interior edge 62 of radially extending annular flange 26 defines lost-motion signal slot 60 and one end of spring arm 54 is cantilevered to one portion of interior edge 62. A portion of interior edge 62 opposite to spring head 55 defines a second drive receiver 64 that is to contact second lug 52 when second lug 52 has moved in slot 60 to assume a first extreme position closure 12 is seated in the filler neck-closing position as shown, for example, in FIGS. 11 and 12.

As noted above, each torque-limited signaler 20 includes a spring arm 54 coupled at one end to closure 12 and provided with a spring head 55 at an opposite end, which spring head 55 is arranged to contact an inclined first drive surface 66 provided on first lug 50 so long as the torque applied to handle 32 in the clockwise, cap-advancing direction is less than a preset torque limit. The spring head 55 will then move to disengage inclined fast drive surface 66 and leave drive notch 56 during a later stage of cap installation to generate temporary lost-motion movement of axially outer portion 16 relative to closure 12 in the clockwise, cap-advancing direction once the clockwise torque applied to a rotatable filler neck cap 10 by a user during installation exceeds the preset torque limit. Each cantilevered spring arm 54 is movable in its lost-motion signal slot 60 from an axially raised position (shown, for example, in FIGS. 8 and 12) to an axially lowered position (shown, for example, in FIG. 16) so that spring head 55 can move into and out of drive notch 56 and to engage and disengage inclined first drive surface 66.

If the torque transmitted from axially outer portion 16 to closure 12 during cap installation increases to a level beyond a preset torque limit, (1) the torque-limited driving connection provided by torque-limit signaler 20 "gives way" or is "broken" to produce an audible or tactile or other signal to the user and (2) axially outer portion 16 begins to rotate independently of closure 12, which independent rotation is indicative of "lost-motion" movement of axially outer portion 16 relative to closure 12. Although continued clockwise rotation of axially outer portion 16 after the signal is produced and the lost-motion phase ends (owing to contact of second lug 52 and second drive receiver 64) will cause further clockwise rotation of closure 12 relative to filler neck 14, an audible or tactile signal is given to the user by torque-limit signaler 20 during the lost-motion phase to alert the user not to rotate handle 32 further in a clockwise, cap-advancing direction so as to protect O-ring seal 24 from unnecessary abrasion due to over-tightening of cap 10 in filler neck 14.

Users of filler neck caps outfitted with conventional torque-limited driving connections will recall that a characteristic repeated "clicking noise" is heard and a series of "clicking bumps" are felt by the user whenever the torque-limited driving connection is broken during cap installation and the cap handle (gripped by the user) begins to rotate freely with respect to the cap closure in the filler neck, thus absorbing "excess torque" while maintaining the handle intact within the cap. In the present disclosure, torque-limited signaler 20 is configured to yield only one "click" (or a selected limited number of "clicks") after the torque-limited driving connection in the cap is broken to provide a "limited-rotation" torque-control system in a filler neck cap. Users of cap 10 will thus hear an abbreviated clicking noise and have an abbreviated tactile clicking sensation whenever the torque-limited driving connection is broken in response to over-torquing or over-tightening cap handle 32 during cap installation.

In illustrative embodiments, cap 10 also includes a lost-motion driver 36 configured to provide a lost-motion driving connection between handle 32 and torque-transmission member 34 so that initial rotation of handle 32 in a counterclockwise, cap-removal direction through a predetermined angle does not impart any rotational movement to closure 12 sufficient to break a sealed connection between closure 12 and filler neck 18. Lost-motion driver 36 includes a pair of arcuate "banana-shaped" lost-motion drive slots 70 formed in a central portion of torque-transmission member 34 to include first and second drive walls 72, 74 at opposite ends of the drive slots 70. Lost-motion driver 36 also includes drive posts 75 coupled to an interior surface 76 in handle 32 and arranged to extend into the arcuate lost-motion drive slots 70. The spacing between the first and second walls 72, 74 of the lost-motion drive slot 70 controls the amount of "lost motion" generated in cap 10 during a first stage of cap removal (shown, for example, in FIGS. 13 and 14) before a direct-drive driving connection is established during a second stage of cap removal (as shown, for example, in FIGS. 17 and 18). Lost-motion driving connections are disclosed in U.S. Pat. Nos. 5,449,086 and 5,638,975 and International (PCT) Publication No. WO 00/20292, which disclosures are hereby incorporated by reference herein.

A pair of position-locator lugs 80 is appended to an exterior surface closure base 22 as shown, for example, in FIGS. 2 and 3. The position-locator lugs 80 are arranged in spaced-apart relation to one another so that one position-indicator lug 80 is positioned to lie about 180° away from the other position-indicator lug 80 about the circumference of cylindrical exterior surface of closure base 22. When closure 12 is inserted into open mouth 30 of filler neck 14, one position-locator lug 80 will pass downwardly into one lug-receiving space 82 and the other position-locator lug 80 will pass downwardly into another lug-receiving space 82 as suggested in FIG. 2. Subsequent rotation of closure 12 about axis of rotation 18 will cause position-locator lugs 80 to engage interior flanges 83 in filler neck 14 to retain cap 10 in place in filler neck 14. Reference is hereby made to U.S. Pat. No. 5,924,590 for additional disclosure relating to the function and operation of position-locator lugs 80 which disclosure is hereby incorporated by reference herein. An alternative system of position-locator lugs is disclosed in U.S. Pat. No. 6,079,584, which disclosure is hereby incorporated by reference herein.

A rotary spring 38 (e.g., torsion spring) is positioned to lie between handle 32 and torque-transmission member 34. Rotary spring 38 has an upper end 84 coupled to a spring mount post 85 in handle grip 33 of handle 32 and a lower end 86 coupled to a spring mount post 87 anchored to a central rotary spring cup 81 included in torque-transmission member 34 as shown, for example, in FIG. 3. Rotary spring 38 functions to rotate handle 32 relative to torque-transmission member 34 each time cap 10 is removed from filler neck 14 to "reset" cap 10 automatically so that a direct-drive relationship between handle 32 and torque-transmission member 34 is established before and during each cap-installation activity.

Installation of cap 10 in filler neck 14 will now be described with reference to an illustrative embodiment shown in FIGS. 7–18. A user will orient handle 32 so that handle grip 33 is "offset" from a vertical position in counterclockwise direction 89 at an angle 88 of about 10° as shown in FIG. 7 and then insert cap 10 into filler neck 14. The vertical position is identified herein and in the drawings as the 0° (i.e., zero degrees) position.

Figure 9:
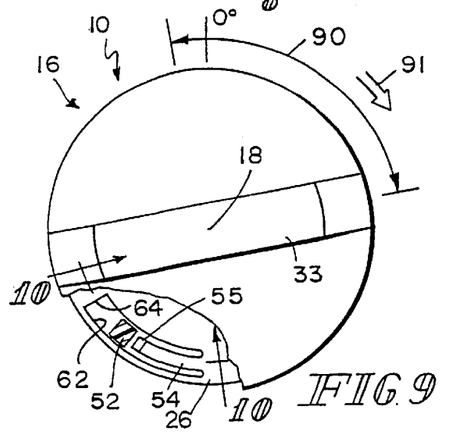
FIG. 9 is a view similar to FIG. 7 after the cap handle has been rotated about 90° in a clockwise, cap-advancing direction to cause the closure base to be positioned "snugly" within the filler neck shown in FIGS. 2 and 3.
Figure 10:
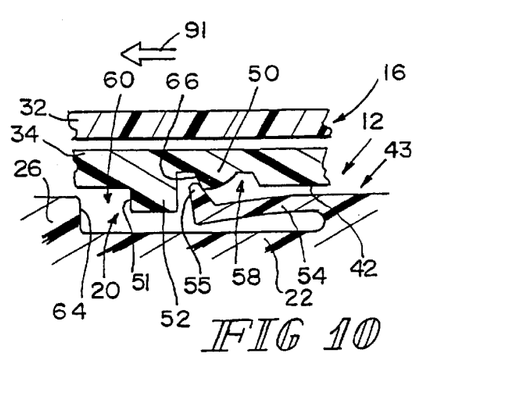
FIG. 10 is a diagrammatic partial sectional view taken along line 10—10 of FIG. 9 showing deflection of the spring arm from the axially raised position of FIG. 8 toward an axially lowered position during clockwise rotation of the torque-transmission member relative to the closure base and movement of the spring head carried on that spring arm as it "leaves" the drive notch and prepares to enter a companion head retainer notch (to assume a retained position shown, for example, in FIG. 12) so as to "break" the driving connection between the torque-transmission member and the closure base so as to provide a limited lost-motion signal to a user rotating the handle during installation of the closure base in a filler neck to seat the closure base in a filler neck-closing position in the filler neck.
Figure 11:
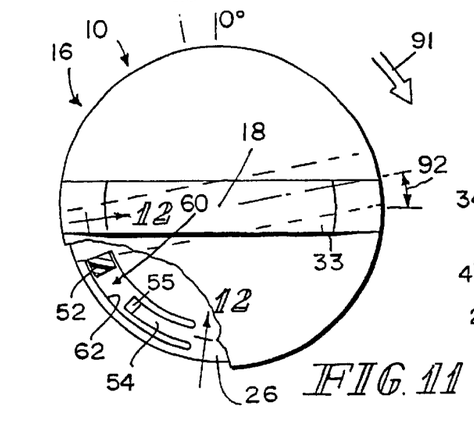
FIG. 11 is a view similar to FIG. 9 after the cap handle has been rotated another 10° in the clockwise cap-advancing direction from the position shown in FIG. 9 to assume a predetermined position with respect to the filler neck wherein the handle grip is arranged to lie in a level "horizontal" orientation.
Figure 12:
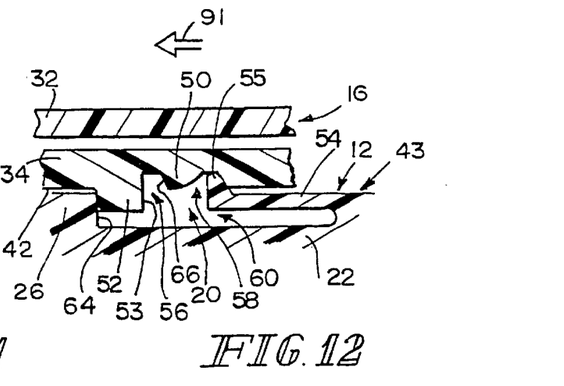
FIG. 12 is a diagrammatic partial sectional view taken along line 12—12 of FIG. 11 showing that the head on the spring arm has moved from an axially raised position in the drive notch as shown in FIG. 8 to assume an axially raised position in the head retainer notch and showing that the large second lug has moved in the lost-motion signal slot to cause a second drive surface of the torque-transmission member to engage a second drive receiver formed along an interior edge of the lost-motion signal slot formed in the closure base so as to "re-establish" a driving connection between the torque-transmission member and the closure base when the torque-transmission member is rotated further in a clockwise cap-advancing direction.

To install cap 10, the user rotates handle 32 about axis 18 in a clockwise, cap-advancing direction 90 from the initial position shown in FIGS. 7 and 8 through an intermediate position shown in FIGS. 9 and 10 to an installed position shown in FIGS. 11 and 12. In the intermediate position, handle 32 has rotated through an angle 90 of about 90° (from the initial position shown in FIG. 7) and spring head 55 is cammed by inclined first drive surface 66 on first lug 50 to bend spring arm 54 and allow spring head 50 to leave drive notch 60 as the clockwise torque applied to handle 32 and torque-transmission member 34 by the user begins to exceed the preset torque limit. When handle 32 reaches intermediate position shown in FIG. 9, closure 12 has been moved to assume its filler neck-closing position in filler neck 14. In the installed position, handle 32 has been rotated through an angle 92 of about 10° (from the intermediate position shown in FIG. 9) to cause handle grip 33 to lie in a level horizontal orientation and spring head 55 has been moved into head retainer notch 58 while second lug 52 has been moved in torque-limit signal slot 60 to cause a second drive surface 51 on second drive lug 52 to contact second drive receiver 64 provided on a portion of the interior edge 62 defining that slot 60 in radially extending annular flange 26 of closure 12.

As handle 32 is being turned about axis 18 through angle 90, inclined first drive surface 66 on first lug 50 contacts first drive receiver 54, 55 to apply a torque to rotate closure 12 about axis 18 in clockwise, cap-advancing direction 91 to assume its filler neck-closing position in filler neck 14. At this stage, spring arm 54 occupies its axially raised position as shown, for example, in FIG. 8 and handle 32 and torque-transmission member 34 are arranged relative to one another to lie in a "first united position."

In the illustrated embodiment, an inclined surface on spring head 55 contacts inclined first drive surface 66 on first lug 50 to establish a torque-limited driving connection therebetween. If a user applies a clockwise torque to handle 32 in excess of the preset torque limit, the inclined surface on spring head 55 will slip on inclined first drive surface 66 to cause spring arm 54 to move to assume an axially lowered position. Such movement of spring arm 54 "breaks" torque-transmitting contact between torque-transmission member 34 of axially outer portion 16 and closure 12 and allows temporary limited lost-motion rotation of handle 32 and torque-transmission member 34 relative to closure 12. The user will sense tacitly that such lost motion has occurred and may hear a noise associated with movement of spring arm 54 to its axially lowered position and spring head 55 into head retainer notch 58 and/or a noise associated with contact of second drive lug 52 on second drive receiver 64 as shown, for example, in FIG. 12. These torque-limit signals are provided to the user so that the user will now release handle 32 when it is in the installed position shown in FIG. 11 and handle 32 and torque-transmission member 34 are arranged relative to one another to lie in a "second united position" as shown in FIG. 12.

In operation, torque-limit signaler 20 allows only limited lost-motion rotation of torque-transmission member 34 relative to closure 12 through a predetermined acute angle of about 10° from a first united position shown in FIGS. 7 and 8 wherein closure 12 is coupled to torque-transmission member 34 for rotation therewith about axis 18 to a second united position shown in FIGS. 11 and 12 wherein closure 12 is again coupled to torque-transmission member 34 for rotation therewith during continued rotation of handle 23 in clockwise, cap-advancing direction 91 about axis of rotation 18 following an initial rotation of handle, torque-transmission member 34, and closure together as a unit in the first united position through an angle 90 of about 90°. This limited lost-motion rotation of torque-transmission member 34 relative to closure 12 signals a person rotating handle 32 to cease rotating handle 32 in clockwise, cap-advancing direction so that clockwise torque is no longer applied by the person to handle 32 once the torque-transmission member has been moved relative 30 to closure to assume the second united position shown, for example, in FIGS. 11 and 12.

Figure 13:
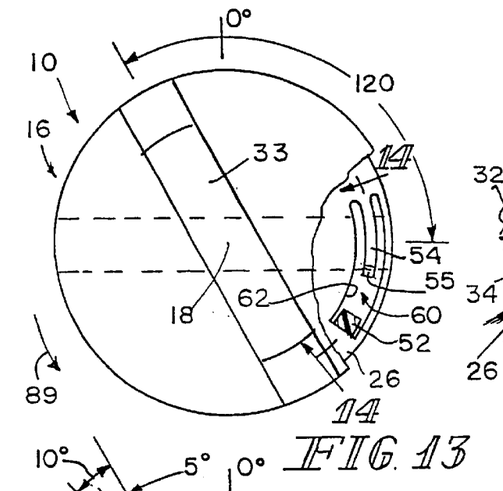
FIG. 13 is a view similar to FIG. 11 of the cap handle during a first lost-motion stage of cap removal after the cap handle has been rotated through a "lost-motion" angle in a counterclockwise cap-removal direction of about 120° relative to the filler neck without any rotation of the underlying closure base relative to the filler neck so as to allow the handle to turn freely through an angle of 120° relative to the closure base before the handle is "reset" to establish a direct-drive driving connection with the underlying torque-transmission member (and thus with the closure base)
Figure 14:
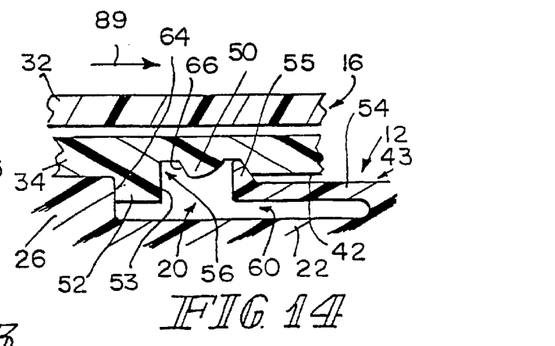
FIG. 14 is a diagrammatic partial sectional view taken along line 14—14 of FIG. 13 showing that the head on the spring arm is maintained in its axially raised position in the head retainer notch formed on the underside of the torque-transmission member during rotation of the cap handle in the counterclockwise cap-removal direction through the lost-motion stage.
Figure 15:
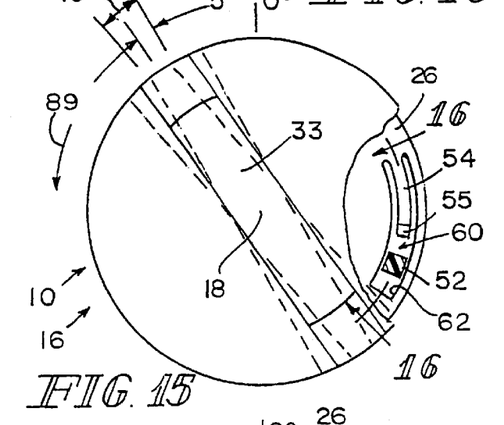
FIG. 15 is a view similar to FIG. 13 of the cap handle near the end of the first lost-motion stage of cap removal showing that the second drive surface on the large second lug will disengage the second drive receiver surface on the closure base once the torque-transmission member begins to rotate in a counterclockwise direction in response to continued rotation of the cap handle in the counterclockwise cap-removal direction.
Figure 16:
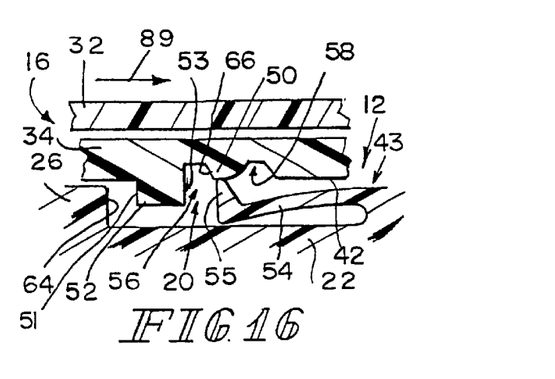
FIG. 16 is a diagrammatic partial sectional view taken along line 16—16 of FIG. 15 showing movement of the head on the spring arm along an exterior surface of the small first lug from the head retainer notch toward the drive notch.

Removal of cap 10 from filler neck 14 will now be described with reference to an illustrative embodiment shown in FIGS. 13–18. The user will rotate handle 32 about axis 18 in counterclockwise, cap-removal direction 89 through a lost-motion angle 120 of about 120° as shown in FIGS. 13 and 14. The arc length of each arcuate "banana-shaped" lost-motion drive slot 70 is about 120° and causes lost-motion angle 120 to be 120°. Handle 32 is able to rotate independently of torque-transmission member 34 because drive posts 75 are moving in the post-receiving arcuate lost-motion drive slots 70 until drive posts 75 contact second drive walls 74. One phantom line position of handle grip 33 in FIG. 15 matches the handle grip position shown in FIG. 13 and another phantom line position of handle grip 33 in FIG. 15 matches the handle grip position shown in phantom in FIG. 17.

Figures 17, 18:
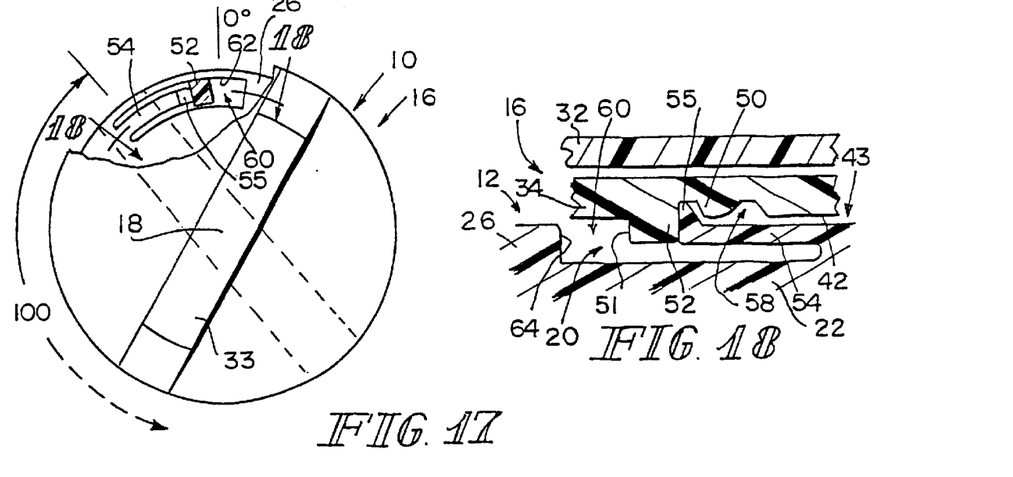
FIG. 17 is a view similar to FIG. 15 of the cap handle during a second direct-drive stage of cap removal after the cap handle has been rotated from a reset position (shown in phantom) in the counterclockwise cap-removal direction another 100° relative to the filler neck to rotate the torque-transmission member and the underlying closure base together as a unit to cause those components to disengage the filler neck to permit a user to remove the cap from the filler neck during refueling.
FIG. 18 is a diagrammatic partial sectional view taken along line 18—18 of FIG. 17 showing that a third drive surface of the torque-transmission member engages a third drive receiver provided on the spring head to establish a direct-drive driving connection between the torque-transmission member and the closure base in response to continued rotation of the cap handle in the counterclockwise cap-removal direction.

The user now continues to rotate handle 32 in counterclockwise, cap-removal direction 89 through a direct-drive angle 100 of, for example, 100° to cause closure base 22 to rotate about axis 18 and disengage filler neck 14. A third drive surface 53 on second lug 52 contacts a third drive receiver provided on spring head 55 when second lug 52 has moved in slot 60 to assume a second extreme position as shown in FIG. 18 to transmit counterclockwise torque from handle 32 and torque-transmission member 34 to closure 12.

Although the invention has been disclosed with reference to certain preferred embodiments, variations and modifications exist within the scope and spirit of the invention as recited in the following claims.

What is claimed is:

1. A torque-limit signal cap for a filler neck, the cap comprising
    an axially outer portion rotatable about an axis of rotation,
    an axially inner portion adapted to close the filler neck, and
    a torque-limit signaler coupled to the axially outer and inner portions and configured to disable temporarily transmission of torque about the axis of rotation in a cap-advancing direction from the axially outer portion to the axially inner portion during rotation of the axially outer portion about the axis of rotation in the cap-advancing direction to signal a person rotating the outer portion that the axially inner portion is seated in a filler neck-closing position, the torque-limit signaler comprising a first drive receiver coupled to the axially inner portion for movement relative to the axially inner portion between an axially raised position and an axially lowered position, a first lug coupled to the axially outer portion to rotate therewith and contact the first drive receiver in the raised position during rotation of the axially outer portion about the axis of rotation in the cap-advancing direction to cause the axially inner portion to rotate about the axis of rotation, the first lug being formed to include an inclined first drive surface configured to urge the first driver receiver in an axially inner direction from the axially raised position to the axially lowered position to allow limited lost-motion rotation of the axially outer portion relative to the axially inner portion once torque in excess of a predetermined amount is applied to the axially outer portion about the axis of rotation during continued rotation of the axially outer portion about the axis of rotation in the cap-advancing direction, a second lug coupled to the axially outer portion to rotate therewith and formed to include a second drive surface, and a second drive receiver coupled to the axially inner portion and located to contact the second drive surface provided on the second lug after limited lost-motion rotation of the axially outer portion relative to the axially inner portion about the axis of rotation in the cap-advancing direction to apply a clockwise torque to the axially inner portion to reestablish torque transmitting connection in the cap-advancing direction without further lost motion and to provide a torque-limit signal indicating to a person rotating the axially outer portion about the axis of rotation in the cap-advancing direction that such limited lost-motion rotation of the axially outer portion relative to the axially inner portion has occurred and sufficient torque has been applied to the axially outer portion about the axis of rotation in the cap-advancing direction during installation of the axially inner portion in a filler neck to seat the axially inner portion in a filler neck-closing position in the filler neck.

2. The cap of claim 1, wherein the second lug includes a third drive surface positioned to lie in spaced-apart relation to the inclined first drive surface provided on the first lug to define a drive notch therebetween and the first drive receiver includes a flexible spring arm coupled at one end to the axially inner portion and provided with a spring head at an opposite end that is arranged to extend into the drive notch when the first drive receiver lies in the axially raised position to maintain contact with the inclined first drive surface on the first lug to provide a torque-limited connection during rotation of the axially outer portion about the axis of rotation in the cap-advancing direction.

3. The cap of claim 2, wherein the axially outer portion includes a handle rotatable about the axis of rotation and a torque-transmission member positioned to lie between the handle and the axially inner portion and formed to include an axially inwardly facing surface and the first and second lugs are appended to the axially inwardly facing surface of the torque-transmission member.

4. The cap of claim 3, wherein the torque-transmission member is formed to include a head retainer notch having a head-receiving opening in the axially inwardly facing surface and receiving the spring head therein when the second drive surface on the second lug contacts the second drive receiver on the axially inner portion and the first lug is positioned to lie between the drive notch and the head retainer notch formed in the torque-transmission member.

5. The cap of claim 2, wherein the axially upper portion is formed to include a head retainer notch arranged to receive the spring head therein when the second drive surface on the second lug contacts the second drive receiver on the axially inner portion.

6. The cap of claim 5, wherein the first lug is positioned on the axially upper portion to lie between the drive notch and the head retainer notch and arranged to maintain contact with the spring head during flexure of the spring arm from the axially raised position to the axially lowered position and the spring arm is configured to provide means for yieldably urging the spring head into the head retainer notch at about the point that the second drive surface on the second lug contacts the second drive receiver on the axially inner portion allowing the spring head to move to assume the axially raised position in the head retainer notch to produce an audible snapping sound associated with the torque-limit signal to provide notice to the person rotating the axially outer portion to cease rotating the axially outer portion in the cap-advancing direction.

7. The cap of claim 2, wherein the spring head is formed to include an inclined surface arranged to mate with the inclined first drive surface on the first lug during rotation of the axially outer portion about the axis of rotation in the cap-advancing direction as long as torque that is not in excess of the predetermined amount is applied to the axially outer portion and the spring head is formed to include a third drive receiver arranged to mate with the third drive surface on the second lug during rotation of the axially outer portion in a cap-removal direction that is opposite to the cap-advancing direction.

8. The cap of claim 7, wherein the axially inner portion is formed to include an interior edge defining a lost-motion signal slot, the spring arm is cantilevered to the interior edge to extend into the lost-motion signal slot and to position the spring head for movement relative to the axially inner portion as the first drive receiver is moved between the axially raised and lowered positions, and one portion of the interior edge defines the second receiver surface and lies in spaced-apart confronting relation to the spring head.

9. The cap of claim 1, wherein the axially-inner portion includes a closure base, an O-ring seal around an exterior surface of the closure base, and a radially extending annular flange positioned to overlie the O-ring seal and formed to include an interior edge defining a lost-motion signal slot, the first drive receiver includes a spring arm cantilevered at one end to one portion of the interior edge and provided with a spring head at an opposite end, the spring arm is arranged to extend into the lost-motion signal slot, and another portion of the interior edge defines the second receiver surface and lies in spaced-apart confronting relation to the spring head.

10. The cap of claim 9, wherein the second lug is positioned to move back and forth in the lost-motion signal slot from a first extreme position contacting the second drive receiver to an opposite second extreme positioning contacting a third drive receiver provided on the spring head.

11. The cap of claim 10, wherein the axially upper portion is formed to include a head retainer notch and a drive notch positioned to lie between the second lug and the head retainer notch and the spring head is positioned to lie in the head retainer notch when the second lug is in the first extreme position and to lie in the drive notch when the second lug is in the opposite second extreme position.

12. The cap of claim 9, wherein the second lug is positioned to move back and forth in the lost-motion signal slot from a first extreme position contacting the second drive receiver to an opposite second extreme position contacting a third drive receiver provided on the spring head, the axially upper portion is formed to include a head retainer notch and a drive notch positioned to lie between the second lug and the head retainer notch, the spring head is positioned to lie in the head retainer notch when the second lug is in the first extreme position and to lie in the drive notch when the second lug is in the opposite second extreme position, the first lug is positioned to lie between the drive notch and the head retainer notch, and the spring head is urged by the spring arm to maintain contact with the first lug during movement of the second lug in the lost-motion signal slot between the first and second extreme positions to produce an audible snapping sound associated with the torque-limit signal upon movement of the spring head into the head retainer notch to provide notice to the person rotating the axially outer portion to cease rotating the axially outer portion in the cap-advancing direction.

13. The cap of claim 9, wherein the axially outer portion includes a handle located over the radially extending annular flange and a torque-transmission member located between the handle and the radially extending annular flange, and further comprising a lost-motion driver comprising a first arcuate lost-motion drive slot formed in the torque-transmission member and a first drive post mounted on an underside of the handle and arranged to extend into the first arcuate lost-motion drive slot and move therein along an arc length thereof during rotation of the handle about the axis of rotation relative to the torque-transmission member.

14. The cap of claim 13, further comprising a rotary spring coupled at one end to the handle and at another end to the torque-transmission member.

15. The cap of claim 9, wherein the torque-transmission member includes a central portion and a radially extending annular rim surrounding the central portion, the radially extending annular rim is positioned to overlie the radially extending annular flange of the axially inner portion and formed to include the first and second lugs, and the central portion is formed to include the first arcuate lost-motion drive slot.

16. The cap of claim 15, wherein the central portion includes a central rotary spring mount cup and a flat ring arranged to extend around the central rotary spring mount cup and formed to include the first arcuate lost-motion drive slot and further comprising a rotary spring coupled at one end to the handle and at another end to the central rotary spring mount cup.

17. The cap of claim 1, wherein the axially outer portion includes a handle rotatable about the axis of rotation and a torque-transmission member positioned to lie between the handle and the axially inner portion, the torque-transmission member is formed to include an axially inwardly facing surface, and the first and second lugs are appended to the axially inwardly facing surface of the torque-transmission member.

18. The cap of claim 17, wherein the first and second lugs cooperate to define a drive notch therebetween, the torque-transmission member is formed to include a head retainer notch, the first lug is positioned to lie between the drive notch and the head retainer notch, the first drive receiver includes a spring arm cantilevered at one end to the axially inner portion and provided with a spring head at an opposite end that is arranged to extend into the drive notch when the second lug is located to contact the spring head and to extend into the head retainer notch when the second drive surface on the second lug is located to contact the second drive receiver.

19. The cap of claim 18, wherein the axially inner portion includes a closure base, an O-ring seal around an exterior surface of the closure base, and a radially extending annular flange positioned to overlie the O-ring seal, the radially extending annular flange is formed to include an interior edge defining a lost-motion signal slot, and the second lug depends from the torque-transmission member and is positioned to move back and forth in the lost-motion signal slot from a first extreme position contacting the second drive receiver provided on a portion of the interior edge and an opposite second extreme position contacting a third drive receiver provided on the spring head.

20. A torque-limit signal cap for a filler neck, the cap comprising
   a handle rotatable about an axis of rotation,
   a closure adapted to close the filler neck,
   a torque-transmission member rotatable about the axis of rotation, the torque-transmission member being positioned to lie between the handle and the closure, and
   signal means for allowing only limited lost-motion rotation of the torque-transmission member relative to the closure through a predetermined acute angle from a first united position wherein the closure is coupled to the torque-transmission member for rotation therewith to a second united position wherein the closure is again coupled to the torque-transmission member for rotation therewith during continued rotation of the handle in a cap-advancing direction about the axis of rotation following an initial rotation of the handle, torque-transmission member, and closure together as a unit in the first united position in the cap-advancing direction about the axis of rotation to signal a person rotating the handle to cease rotating the handle in the cap-advancing direction so that torque is no longer applied to the handle once the torque-transmission member has been moved relative to the closure to assume the second united position.

21. The cap of claim 20, wherein the signal means includes a drive notch formed in the torque-transmission member, a head retainer notch formed in the torque-transmission member, a first lug appended to the torque-transmission member and positioned to lie between the drive notch and the head retainer notch, a flexible spring arm cantilevered at one end to the closure and provided with a spring head at an opposite end, the spring head is urged by the flexible spring arm to extend into the drive notch upon movement of the torque-transmission member relative to the closure to assume the first united position, and the spring head is urged by the flexible spring arm to extend into the head retainer notch upon movement of the torque-transmission member relative to the closure to assume the second united position.

22. The cap of claim 21, wherein the signal means further includes a second lug appended to the torque-transmission member and positioned to lie in spaced-apart relation to the first lug to define the drive notch therebetween and the second lug is arranged to contact the closure following limited lost-motion rotation of the torque-transmission member in the cap-advancing direction about the axis of rotation to establish the second united position.

23. The cap of claim 22, wherein the spring head and the flexible spring arm cooperate to provide a first drive receiver coupled to the closure for movement relative to the closure between an axially raised position and an axially lowered position, the first lug is formed to include an inclined first drive surface configured to urge the first drive receiver in an axially inner direction from the axially raised position to the axially lowered position to allow limited lost-motion rotation of the torque-transmission member relative to the closure once torque in excess of a predetermined amount is applied to the handle about the axis of rotation during continued rotation of the handle in the cap-advancing direction, the second lug is formed to include a second drive surface, the closure is formed to include an interior edge defining a lost-motion signal slot containing the second lug, spring head, and flexible spring arm, and one portion of the interior edge defines a second receiver surface arranged to contact the second drive surface on the second lug following limited lost-motion rotation of the torque-transmission member relative to the closure through the predetermined acute angle.

24. The cap of claim 20, wherein the signal means comprises
   a first drive receiver coupled to the closure for movement relative to the closure between an axially raised position and an axially lowered position,
   a first lug coupled to the torque-transmission member to rotate therewith and contact the first drive receiver in the raised position during rotation of the torque-transmission member about the axis of rotation in the cap-advancing direction to cause the closure to rotate about the axis of rotation, the first lug being formed to include an inclined first drive surface configured to urge the first driver receiver in an axially inner direction from the axially raised position to the axially lowered position to allow limited lost-motion rotation of the torque-transmission member relative to the closure once torque in excess of a predetermined amount is applied to the handle and torque-transmission member about the axis of rotation during continued rotation of the handle and torque-transmission member about the axis of rotation in the cap-advancing direction,
   a second lug coupled to the torque-transmission member to rotate therewith and formed to include a second drive surface, and
   a second drive receiver coupled to the closure and located to contact the second drive surface provided on the second lug after limited lost-motion rotation of the torque-transmission member relative to the closure about the axis of rotation in the cap-advancing direction while the first drive receiver is maintained in the axially lowered position to apply a clockwise torque to the closure to provide a torque-limit signal indicating to a person rotation the handle and the torque-transmission member about the axis of rotation in the cap-advancing direction that such limited lost-motion rotation of the torque-transmission member relative to the closure has occurred and sufficient torque has been applied to the handle and the torque-transmission member about the axis of rotation in the cap-advancing direction during installation of the closure in a filler neck to seat the closure in a filler neck-closing position in the filler neck.

25. The cap of claim 24, wherein the second lug includes a third drive surface positioned to lie in spaced-apart relation to the inclined first drive surface provided on the first lug to define a drive notch therebetween and the first drive receiver includes a flexible spring arm coupled at one end to the closure and provided with a spring head at an opposite end that is arranged to extend into the drive notch when the first drive receiver lies in the axially raised position to maintain contact with the inclined first drive surface on the first lug to provide a torque-limited connection during rotation of the handle and the torque-transmission member about the axis of rotation in the cap-advancing direction.

26. The cap of claim 24, wherein the closure includes a closure base, an O-ring seal around an exterior surface of the closure base, and a radially extending annular flange positioned to overlie the O-ring seal and formed to include an interior edge defining a lost-motion signal slot and the first drive receiver includes a flexible spring arm cantilevered at one end to one portion of the interior edge and provided with a spring head at an opposite end, the flexible spring arm is arranged to extend into the lost-motion signal slot, and another portion of the interior edge defines the second receiver surface and lies in spaced-apart confronting relation to the spring head.

27. The cap of claim 26, wherein the second lug is positioned to move back and forth in the lost-motion signal slot from a first extreme position contacting the second drive receiver to an opposite second extreme positioning contacting a third drive receiver provided on the spring head.

28. The cap of claim 27, wherein the axially upper portion is formed to include a head retainer notch and a drive notch positioned to lie between the second lug and the head retainer notch and the spring head is positioned to lie in the head retainer notch when the second lug is in the first extreme position and to lie in the drive notch when the second lug is in the opposite second extreme position.

29. A torque-limit signal cap for a filler neck, the cap comprising
   an axially outer portion rotatable about an axis of rotation,
   an axially inner portion adapted to close the filler neck, and
   a torque-limit signaler coupled to the axially outer and inner portions and configured to provide means for temporarily interrupting a driving connection established between the axially outer and inner portions to cause the axially outer portion to rotate through a predetermined acute angle about the axis of rotation relative to the axially outer portion once torque in excess of a predetermined amount is applied to the axially outer portion about the axis of rotation in a cap-advancing direction to provide a limited lost-motion signal to a user rotating the axially outer portion during installation of a cap in a filler neck to indicate that sufficient torque has been applied to the axially outer portion during installation of the axially inner portion in a filler neck to seat the axially inner portion in a filler neck-closing position in the filler neck and for reestablishing the driving connection between the axially outer and inner portions after the axially outer portion has been rotated through the predetermined acute angle to discontinue provision of the limited lost-motion signal to the user.

30. The cap of claim 29, wherein the axially outer portion includes a handle rotatable about the axis of rotation and a torque-transmission member positioned to lie between the handle and the axially inner portion and the torque-limit signaler is coupled to the torque-transmission member.

31. The cap of claim 30, further comprising a lost-motion driver comprising a first arcuate lost-motion drive slot formed in the torque-transmission member and a first drive post mounted on an underside of the handle and arranged to extend into the first arcuate lost-motion drive slot and move therein along an arc length thereof during rotation of the handle about the axis of rotation relative to the torque-transmission member.

32. The cap of claim 31, further comprising a rotary spring coupled at one end to the handle and at another end to the torque-transmission member.

* * * * *